(12) United States Patent
Pitts et al.

(10) Patent No.: US 11,160,638 B2
(45) Date of Patent: Nov. 2, 2021

(54) ORTHODONTIC SYSTEM WITH VARIABLY-SIZED ARCHWIRE SLOT

(71) Applicant: World Class Technology Corporation, McMinnville, OR (US)

(72) Inventors: Thomas Pitts, Reno, NV (US); Alberto Ruiz-Vela, Alta Loma, CA (US)

(73) Assignee: WORLD CLASS TECHNOLOGY CORPORATION, McMinnville, OR (US)

(*) Notice: Subject to any disclaimer, the term of this patent is extended or adjusted under 35 U.S.C. 154(b) by 372 days.

(21) Appl. No.: 15/958,505

(22) Filed: Apr. 20, 2018

(65) Prior Publication Data
US 2018/0235732 A1    Aug. 23, 2018

Related U.S. Application Data

(63) Continuation-in-part of application No. 15/601,646, filed on May 22, 2017, now Pat. No. 10,357,337.

(60) Provisional application No. 62/441,839, filed on Jan. 3, 2017.

(51) Int. Cl.
*A61C 7/28*    (2006.01)
*A61C 7/14*    (2006.01)
*A61C 7/22*    (2006.01)

(52) U.S. Cl.
CPC ............... *A61C 7/287* (2013.01); *A61C 7/22* (2013.01); *A61C 7/14* (2013.01)

(58) Field of Classification Search
CPC .... A61C 7/00; A61C 7/12; A61C 7/14; A61C 7/20; A61C 7/141; A61C 7/22; A61C 7/287
USPC ........................................................ 433/2–20
See application file for complete search history.

(56) References Cited

U.S. PATENT DOCUMENTS

| | | | |
|---|---|---|---|
| 2,908,974 A * | 10/1959 | Stifter | A61C 7/12 433/16 |
| 3,660,900 A | 5/1972 | Andrews | |
| 3,916,526 A * | 11/1975 | Schudy | A61C 7/30 433/8 |
| 4,249,897 A | 2/1981 | Anderson | |

(Continued)

FOREIGN PATENT DOCUMENTS

| EP | 1234549 A1 | 2/2001 |
|---|---|---|
| WO | 2012056408 A1 | 5/2012 |

OTHER PUBLICATIONS

International Searching Authority United States Patent Office, International Search Report and Written Opinion, PCT/US18/12085, dated Mar. 9, 2018, 11 pp.

(Continued)

*Primary Examiner* — Edward Moran
*Assistant Examiner* — Matthew P Saunders
(74) *Attorney, Agent, or Firm* — Stoel Rives LLP

(57) ABSTRACT

The disclosure relates to an orthodontic system and treatment method, including an arrangement of orthodontic brackets against the patient's teeth such that the depth of the respective archwire slots of the brackets generally increases from the anterior teeth moving toward the posterior teeth. The gradual increase of the archwire slot in the bracket arrangement provides for finer control over the movement of the anterior teeth, while providing sufficient control and freedom of movement for the posterior teeth.

13 Claims, 7 Drawing Sheets

(56) References Cited

U.S. PATENT DOCUMENTS

| | | | |
|---|---|---|---|
| 4,597,739 A * | 7/1986 | Rosenberg | A61C 7/14 433/16 |
| 5,044,945 A | 9/1991 | Peterson | |
| 5,139,419 A * | 8/1992 | Andreiko | A61C 7/12 433/24 |
| 5,540,586 A | 7/1996 | Hanson | |
| 6,315,553 B1 * | 11/2001 | Sachdeva | A61C 7/00 433/213 |
| 2002/0110775 A1 | 8/2002 | Abels | |
| 2003/0163291 A1 | 8/2003 | Jordan et al. | |
| 2005/0244774 A1 | 11/2005 | Abels et al. | |
| 2006/0147872 A1 | 7/2006 | Andreiko | |
| 2007/0092849 A1 | 4/2007 | Cosse | |
| 2008/0268398 A1 * | 10/2008 | Cantarella | A61C 7/20 433/20 |
| 2009/0136889 A1 | 5/2009 | Abels et al. | |
| 2010/0323315 A1 | 12/2010 | Takemoto | |
| 2011/0151390 A1 | 6/2011 | Takemoto | |
| 2011/0183280 A1 | 7/2011 | Cosse et al. | |
| 2012/0070795 A1 * | 3/2012 | Kyritsis | A61C 7/14 433/10 |
| 2012/0094247 A1 * | 4/2012 | Lewis | A61C 7/14 433/9 |
| 2012/0308952 A1 | 12/2012 | Cosse | |
| 2013/0252194 A1 | 9/2013 | Hagelganz et al. | |
| 2015/0050612 A1 | 2/2015 | Damon et al. | |
| 2015/0086936 A1 * | 3/2015 | Owen | A61C 7/20 433/10 |
| 2017/0151037 A1 * | 6/2017 | Lee | A61C 7/28 |
| 2017/0172708 A1 | 6/2017 | Damon et al. | |

OTHER PUBLICATIONS

International Search Report and Written Opinion for International Application No. PCT/US2018/028680, dated Jul. 11, 2018, 9 pages.
European Patent Office, Extended European Search Report for Application 18736198.5, dated Jul. 20, 2020, 3 pages.
Extended European Search Report and Opinion for application No. 18806649.2, dated Feb. 9, 2021, 6 pages.

* cited by examiner

ORTHODONTIC SYSTEM WITH VARIABLY-SIZED ARCHWIRE SLOT

RELATED APPLICATION DATA

This application is a continuation-in-part of and claims the benefit under 35 U.S.C. § 120 from U.S. patent application Ser. No. 15/601,646, filed May 22, 2017, which is a nonprovisional of and claims the benefit under 35 U.S.C. § 119(e) of U.S. Provisional Patent Application No. 62/441,839, filed Jan. 3, 2017, the disclosures of which are each incorporated by reference herein in its entireties.

TECHNICAL FIELD

The field of the present disclosure relates generally to orthodontic brackets and, in particular, to such brackets used to correct misalignment of a patient's teeth. Such appliances, typically referred to as braces, are used to align and straighten teeth so as to both position them with regard to a person's bite, as well as improve the appearance of a patient's mouth. Such appliances may be used to correct underbites, overbites, malocclusions, and various other misalignments of the teeth.

BACKGROUND

Dental braces are orthodontic devices commonly used to align and straighten a patient's teeth and to correct various other flaws relating to the teeth and jaw. Typically, braces include a set of orthodontic brackets, each bracket being adhered to an individual tooth with a bonding material or other adhesive. Once the brackets are in position on the teeth, an archwire is inserted through a slot formed on each of the brackets. In this configuration, tightening of the archwire applies pressure on the brackets, which in turn urge movement of the teeth into a desired position and orientation. In conventional braces, an elastic ligature or O-ring may be used to retain the archwire in position and ensure that the archwire does not disengage from the bracket slot. In more recent designs, self-ligating braces use a sliding or hinged door mechanism, instead of an elastic ligature, to secure the archwire within the bracket slot.

Treatment of a patient's teeth using braces to correct dental issues typically requires several appointments to monitor progress and make adjustments to the braces as treatment progresses. Accordingly, the present inventors have identified a need for an improved system that streamlines the treatment process to reduce the length of treatment by more efficiently aligning a patient's teeth. Additional aspects and advantages will be apparent from the following detailed description of preferred embodiments, which proceeds with reference to the accompanying drawings.

DETAILED DESCRIPTION OF EXAMPLE EMBODIMENTS

Figure 1:
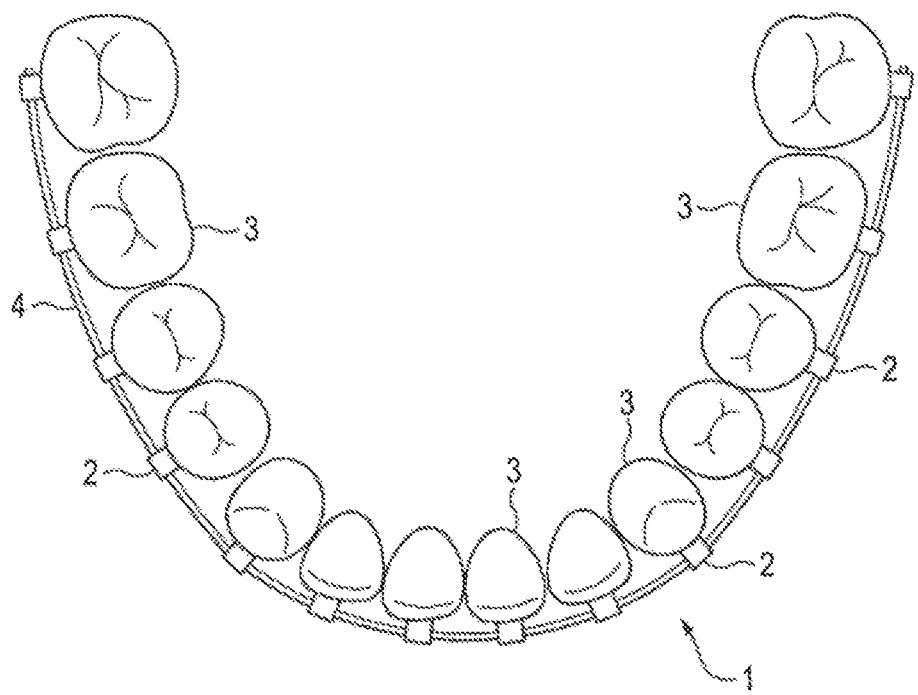
FIG. 1 is a view illustrating a row of teeth with dental appliances attached thereto using an archwire.

With reference to the drawings, this section describes particular embodiments of various orthodontic brackets and their detailed construction and operation. Throughout the specification, reference to "one embodiment," "an embodiment," or "some embodiments" means that a particular described feature, structure, or characteristic may be included in at least one embodiment of an orthodontic bracket. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

In the following description, particular components of the orthodontic brackets may be described in detail. It should be understood that in some instances, well-known structures, materials, or operations are not shown and/or not described in detail to avoid obscuring more pertinent aspects of the embodiments. In addition, although the embodiments may illustrate and reference particular orthodontic bracket designs, other embodiments may include additional or fewer components than the described embodiments.

With general reference to the figures, the following disclosure relates to an orthodontic system designed for improving orthodontic treatments. The orthodontic system described in detail below uses the relationship between the dimension of the archwire relative to the dimension of the archwire slot in the dental brackets to increase precision and control of the forces applied to the teeth during the treatment process. Briefly, the orthodontic brackets are arranged against the patient's teeth such that the depth of the respective archwire slots of the brackets generally increases moving from the anterior teeth toward the posterior teeth. In some embodiments, the depth of the archwire slots may not necessarily increase for each subsequent bracket on each tooth beginning with the anterior teeth. For example, in some embodiments, the central, lateral and cuspid teeth may each have a first bracket with a first archwire slot, the bicuspids may each have a second bracket with an archwire slot deeper than the first archwire slot of the first bracket, and the molars may each have a third bracket with an archwire slot deeper than the archwire slot of the second bracket.

In either embodiment, as the archwire progresses from a round cross-section at the start of treatment and then through various round and square cross-sections over the course of treatment, the forces created by the archwire as it pushes against the brackets within the archwire slot urges all teeth to move. Because the dimension of the archwire slot is smallest at the anterior teeth and largest at the posterior teeth, the treatment provides better control and tighter precision for the anterior teeth, while providing sufficient freedom of movement to allow all teeth to move and settle properly. As is described in further detail below, the gradual progression of archwire slot sizes from the anterior to posterior teeth is specifically designed to start the detailing and alignment process of the teeth earlier in the process as compared to conventional treatments, thereby reducing overall treatment time. Additional details relating specifically to the orthodontic treatment system and related treatment methods are further described in detail below with reference to the figures.

Before turning to the written description, the following is a list of terms that are used in the disclosure. The terms are used in accordance with the meaning understood by those having skill in the art, but are provided herein to ensure consistency and to facilitate understanding of the specification by those unskilled in the art.

Anterior—the direction towards the front of the head, or the lips; opposite of "posterior."

Anterior teeth—the teeth on either one of the mandibular or maxillary jaws extending from one canine tooth to the other canine tooth.

Buccal—the direction towards the cheek, typically used in connection with posterior teeth; opposite of "lingual."

Buccal-lingual direction—a direction through or along any particular posterior tooth extending between a patient's cheek and the patient's tongue.

Distal—the direction on the side of a particular tooth away from the dental midline; opposite of mesial.

Dental arch—a row of teeth in either of the mandibular or maxillary jaws.

Dental midline—an imaginary line dividing a patient's mouth into two halves, extending through the patients two middle anterior teeth and towards the back of the mouth.

Gingival—a direction towards the gums beneath a particular tooth.

Incisal—a direction towards the biting surface of a particular anterior tooth.

Incisal-gingival direction—a direction through or along any particular anterior tooth extending from the biting surface to the gums beneath that tooth.

Labial—the direction towards the lips, typically used in connection with anterior teeth; opposite of lingual.

Labial-lingual direction—a direction through or along any particular anterior tooth extending between the patient's lips to the patient's tongue.

Mandibular—related to the lower jaw.

Maxillary—related to the upper jaw.

Mesial—the direction on the side of a particular tooth toward the dental midline; opposite of distal.

Mesial-distal direction—the direction through any particular tooth extending from the mesial side of the tooth to the distal side of the tooth. The mesial-distal direction, relative to a tooth, is essentially along the curved line through the relevant upper or lower row of teeth.

Occlusal—a direction towards the biting surface of a particular posterior tooth.

Occlusal-gingival direction—a direction through or along any particular posterior tooth extending from the biting surface to the gums beneath that tooth Posterior—the direction towards the back of the head; opposite of anterior.

Posterior teeth—the teeth on either one of the mandibular or maxillary jaws posterior of a canine tooth.

Rotation—angular rotation of a tooth during the course of treatment around a vertical axis oriented in the incisal-gingival direction.

Tip—angular rotation of a tooth during the course of treatment around a horizontal axis oriented in the buccal-lingual direction.

Torque—angular rotation of a tooth during the course of treatment around a horizontal axis oriented in the mesial-distal direction.

Figure 2:
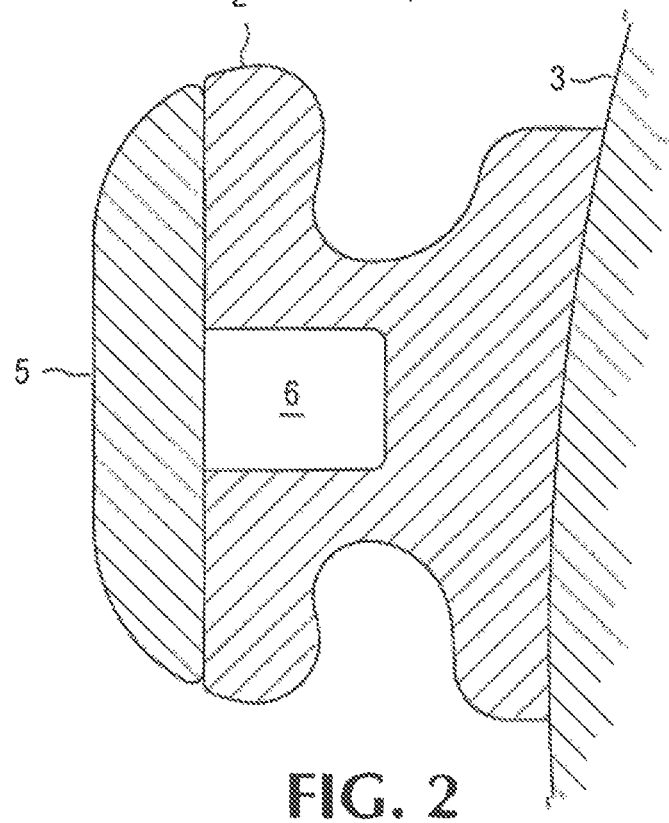
FIG. 2 is a sectional view of a dental appliance of FIG. 1.

With general reference to FIGS. 1 and 2, the following briefly describes a treatment system 1 in accordance with a conventional process. With reference to the figures, the treatment system 1 comprises a plurality of brackets 2 applied to a row of patient's teeth 3. The brackets 2 are connected together by an archwire 4 through appropriate means such as via an archwire slot 6, and a ligating structure such as a cover 5 for retaining the archwire 4 in the archwire slot 6. As noted earlier, treatment of a patient using braces typically requires repeated adjustment of the archwire 4 so that, over time, the tension in the archwire 4, applied to the teeth 3 through the brackets 2, causes the teeth 3 to migrate to a desired final position.

Figure 3A:
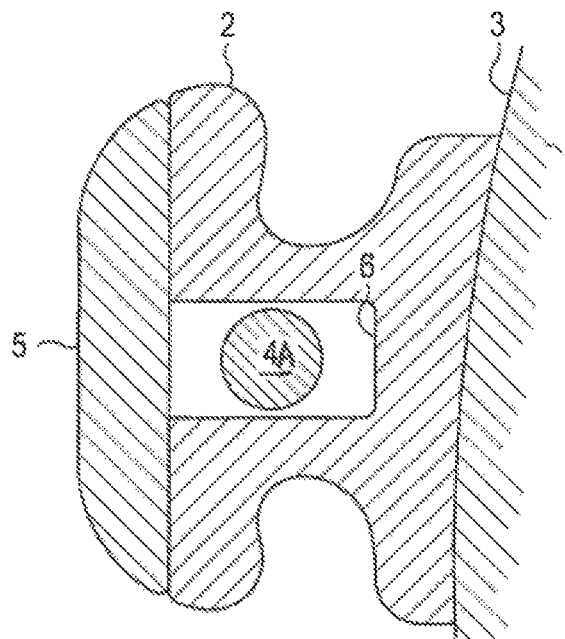
FIGS. 3A, 3B, and 3C collectively illustrate an example temporal progression of a conventional treatment program that progressively applies differently-shaped archwires to the dental appliances of FIG. 1 so as to incrementally move a patient's teeth towards a desired position.
Figure 3B:
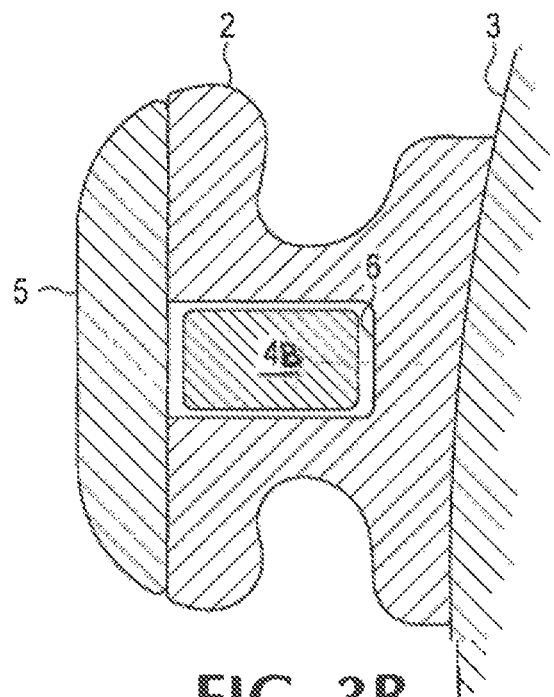
Figure 3C:
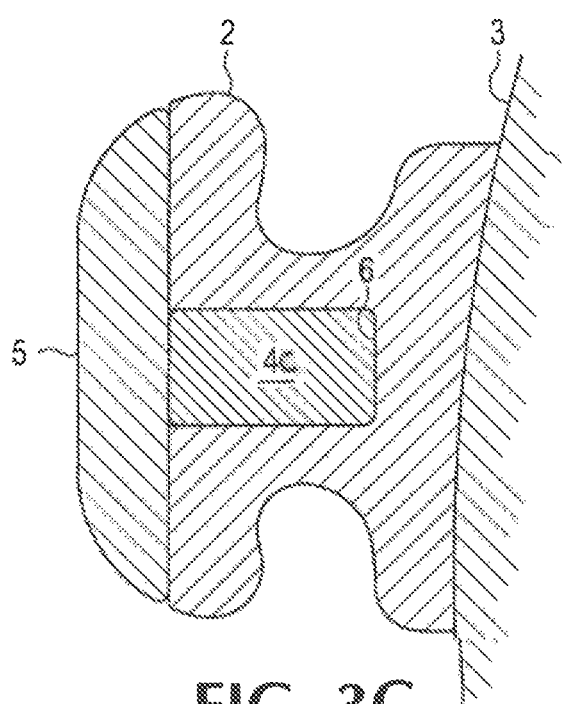

FIGS. 3A, 3B, and 3C collectively illustrate an example temporal progression of a conventional treatment program that progressively applies differently-shaped archwires to the dental appliances of FIG. 1 so as to incrementally move a patient's teeth towards a desired position. Referring to FIG. 3A, an archwire slot 6 formed in each the respective brackets 2 may be formed as an elongated rectangular aperture closed along a top end of the bracket 2 by a ligating structure 5. The ligating structure 5 may be a sliding or hinged door that extends over the archwire slot 6, or may be an elastic band, or any other appropriate structure. When a set of braces is first applied to each of a patient's teeth, an archwire 4A of a circular cross section may be used. Usually the circular archwire 4A is made of a nickel-titanium material that is relatively flexible so that, in combination with the circular cross-sectioned archwire 4A fitted in a rectangular slot 6, the archwire 4A applies relatively low forces to a patient's teeth 3, and the brackets 2 have significant play to move relative to each other as the teeth 3 move towards a more aligned state. When the circular archwire 4A is used in the treatment process, there is no torque control of the teeth 3 since twisting the archwire 4A will not apply any rotational forces to the bracket 2.

Eventually, in a second stage of treatment shown in FIG. 3B, the archwire 4A of a circular cross section is replaced by an archwire 4B of a rectangular square cross section. Depending on the degree of correction needed for the patient's teeth, the archwire 4B may be made of nickel-titanium (similar to the round archwire 4A) or may be made of a stiffer material, such as a beta-titanium alloy, if a larger degree of correction is necessary. As illustrated in FIG. 3B, the archwire 4B has a slightly smaller overall dimension than the archwire slot 6, but has a larger overall cross-section than the round archwire 4A using in the first stage of treatment. Accordingly, the archwire 4B is capable of applying increased force and control to the teeth 3, and the brackets 2 have less play relative to the archwire 4A than existed in the first stage of treatment.

In a final stage of treatment, the archwire 4B is replaced with another rectangular archwire 4C of a larger cross section as illustrated in FIG. 3C. The archwire 4C is typically much stiffer than the archwire 4B it replaces, and may be made of stainless steel or other similarly stiff material. This third stage of treatment again increases the force and control applied to the teeth 3 through the archwire 4C and brackets 2 as compared to the previous stage of treatment. Due to the tighter fit of the archwire 4C in the archwire slot 6, the brackets 2 have very little play relative to each other than existed in either of the first and second stages of treatment.

As mentioned previously, the present inventors have determined that an improved and more efficient treatment system and method could be applied than the conventional system described in FIGS. 3A-3C, based on the realization that not all teeth need to be simultaneously subjected to the same amount of force and/or not all teeth require the same amount of play during treatment. In other words, a uniform force profile is not needed for all teeth. On the contrary, a force profile that varies for different teeth (e.g., anterior teeth vs. posterior teeth) as needed not only reduces overall treatment time, but also provides higher control for tooth movement where needed.

The present inventors understand that one of the primary objects of dental treatment with braces is the precise positioning of the anterior teeth so as to achieve a desired aesthetic look, and that positioning of the posterior teeth need not be as precise. Accordingly, an improved treatment system preferably uses a set of brackets for placement along a dental arch, either mandibular or maxillary, where the cross section of the archwire slot varies in the distal direction of the arch from the dental midline (i.e., from the anterior brackets to the posterior brackets) to effect targeted force profiles on the anterior and posterior teeth as needed. This system provides for the following benefits compared to conventional systems: (1) improved quality of treatment due to increase control of the teeth in the anterior segment of the dental arch; (2) earlier control of tooth movement in treatment, resulting in a reduced treatment time when compared to current systems while providing appropriate freedom of movement such that the teeth can efficiently move to the desired position; and (3) an improved patient experience due to low and efficient forces due to appropriate sizing of the archwire dimensions. Additional details of the improvement orthodontic treatment method and system are provided below.

Figure 4:
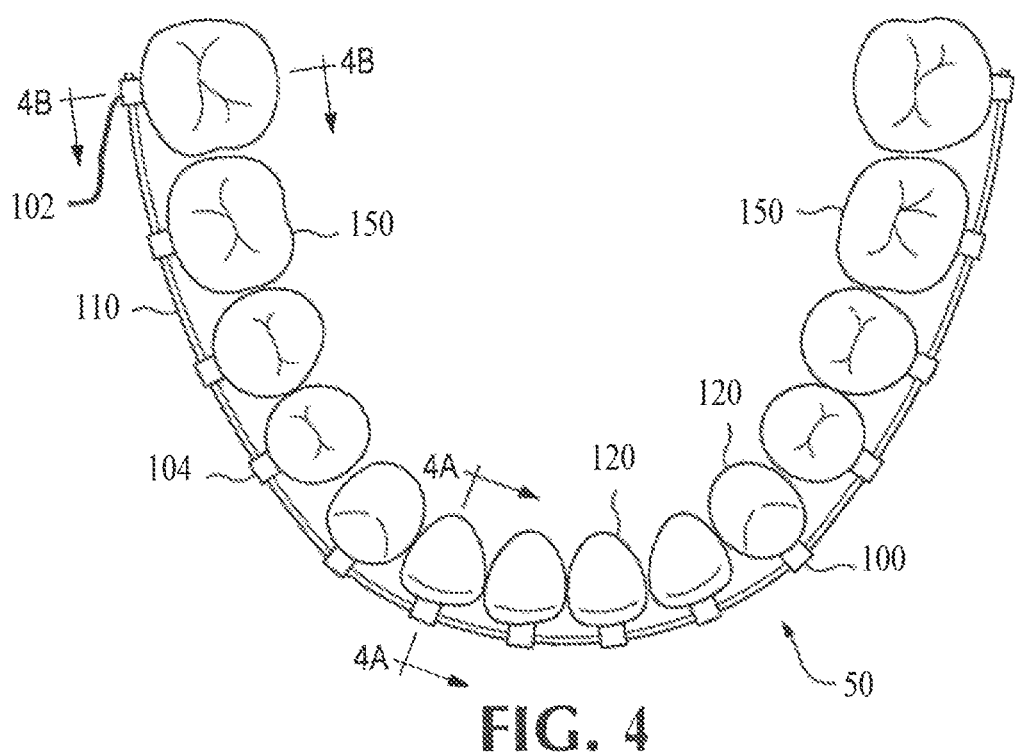
FIG. 4 is a view illustrating a row of teeth with dental appliances attached in accordance with disclosed embodiments.
Figure 4A:
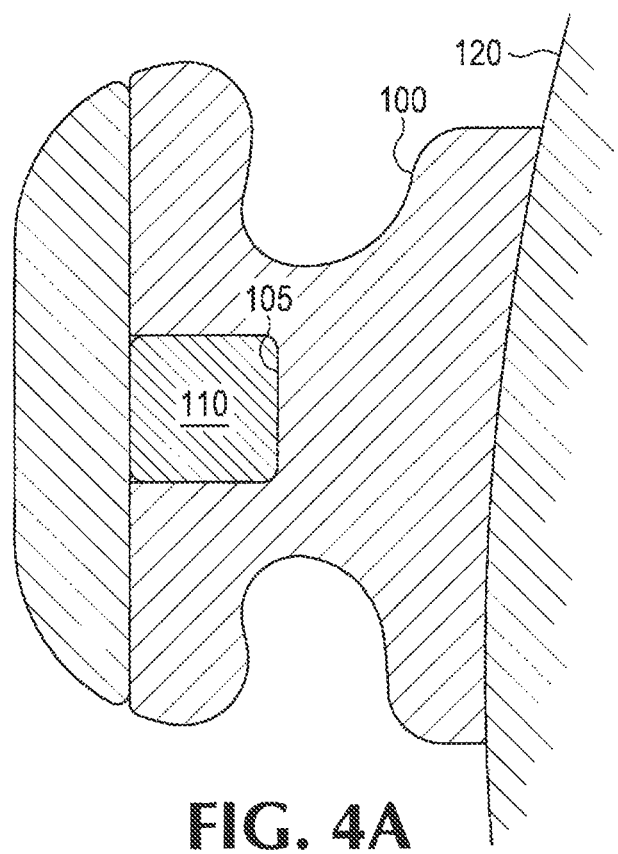
FIGS. 4A and 4B illustrates a cross section along lines A-A and B-B, respectively, of FIG. 4 using a novel orthodontic system disclosed in the present specification.
Figure 4B:
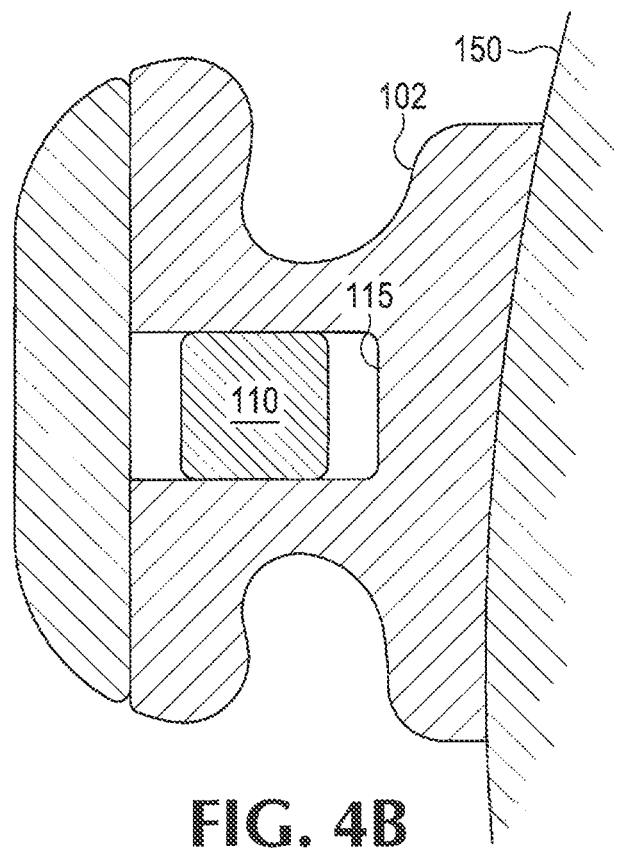

With particular reference to FIGS. 4, 4A, and 4B, the following description provides an overview of the improved treatment method disclosed herein. The remaining figures illustrate additional details relating to examples of how the disclosed treatment system and method provide better torque, rotation, and tip control to urge the teeth into a desired alignment as compared to a conventional orthodontic treatment.

FIG. 4 illustrates an example row of a patient teeth 50 with a plurality of brackets 100, 102, 104 where a single bracket is attached to each of the anterior teeth 120 (e.g., central, lateral, and cuspid) through the posterior teeth 150 (bicuspids and molars). The brackets 100, 102, 104 each include an archwire slot 105, 115, respectively, (cross-section of bracket 104 is not illustrated in FIGS. 4A, 4B) sized and dimensioned for receiving an archwire 110 therethrough, the archwire 110 connecting all the brackets 100, 102, 104 together and providing force against each of the brackets 100, 102, 104 to urge the teeth into a desired alignment.

Preferably, the occlusal-gingival dimension of the archwire slots 105, 115 (i.e., the width of archwire slot) is the same or substantially the same (e.g., within manufacturing tolerances) for all brackets 100, 102, 104 in the set. Maintaining the width of the archwire slot equal (or substantially equal) across all brackets enhances the accuracy of the torque and tip positioning of all of the teeth in the maxillary and mandibular dental arches as further described in detail below. However, the labial-lingual dimension of the archwire slots 105, 115 (i.e., the depth of archwire slot measured from the top surface of the bracket body to the archwire floor) is progressively increased from the bracket 100 positioned on the anterior teeth 120 to the bracket 102 positioned on the posterior teeth 150.

In this configuration, the set of brackets 100 on the anterior teeth 120 are all preferably identical, each having an archwire slot 105 of a minimum depth (i.e., these brackets have an archwire slot with the smallest cross-sectional size), and the brackets 102 on the posterior teeth 150 (primarily the molars) have an archwire slot 115 of a maximum depth (i.e., these brackets have an archwire slot with the largest cross-sectional size), with the archwire slots (not shown) on the posterior brackets 104 of the bicuspids having a depth that is somewhere in between the respective depth of the archwire slots 105, 115 of the brackets 100, 102. In some embodiments, the archwire slot 105 of the anterior bracket 100 may have a generally square-shaped cross-section, while the archwire slot (not shown) on the bicuspid brackets may have a generally rectangular-shaped cross-section, and the archwire slot 115 of the posterior brackets 102 has a more elongated rectangular-shaped cross-section.

The arrangement of sets of brackets with progressively increasing archwire slot depth provides sufficient precision and tighter control for the anterior teeth 120 to facilitate achieving a desired aesthetic look, while also allowing increased freedom of movement for the bicuspids and the molars to ensure all teeth are properly aligned when the treatment is complete. The following section provides additional details of these embodiments with reference to an example arrangement of the orthodontic brackets.

To provide a standard frame of reference that may be applied across a broad range of differently-sized brackets, the following example describes the relationship of the labial-lingual dimension of the archwire slot (e.g., the depth) with relation to the labial-lingual dimension of the archwire. It should be understood that the ratios described herein may apply to any size of the orthodontic brackets, including standard bracket sizes now available and other bracket sizes that may be developed in the future.

As noted above, the labial-lingual dimension of the archwire slot in the brackets is progressively increased from the anterior brackets to the posterior brackets, such that the anterior teeth, bicuspids, and molars are subjected to different force profiles specifically targeted for best controlling movement for the respective teeth. Table 1 below illustrates an example configuration in accordance with one embodiment, with the depth of the archwire slot presented as a percentage of the labial-lingual dimension of the archwire from the central teeth to the molars in both the maxillary and mandibular dental arches.

TABLE 1

LABIAL-LINGUAL DIMENSION OF SLOT AS (%) OF ARCHWIRE LABIAL-LINGUAL DIMENSION

| Tooth Position | Example Embodiment (%) | Range Minimum (%) | Range Maximum (%) |
|---|---|---|---|
| Central | 105 | 102 | 110 |
| Lateral | 105 | 102 | 110 |
| Cuspid | 105 | 102 | 110 |
| 1$^{st}$ Bicuspid | 115 | 110 | 125 |
| 2$^{nd}$ Bicuspid | 115 | 110 | 125 |
| 1$^{st}$ Molar | 130 | 120 | 140 |
| 2$^{nd}$ Molar | 130 | 120 | 140 |

With collective reference to FIG. 4 and Table 1, during an example orthodontic treatment method, the brackets 100 are attached to the anterior teeth 120 (central, lateral, and cuspid teeth) of the patient. As noted previously and illustrated in table 1, all brackets 100 are preferably identical such that all anterior teeth 120 each have a bracket with identical dimensions relative to one another. As noted in Table 1, the labial-lingual dimension of the archwire slot 105 ranges from 102%-110% of the corresponding dimension of the archwire 110. Next, brackets 104 are attached to the first and second bicuspids of the patient, with the labial-lingual dimension of the archwire slot for those brackets ranging from 110%-125%. Finally, the brackets 102 are attached to the posterior teeth 150 (e.g., first and second molars, may include a third molar if present) of the patient. As noted in Table 1, the labial-lingual dimension of the archwire slot 115 for the brackets 102 ranges from 120%-140% of the corresponding dimension of the archwire 110. As noted previously, the occlusal-gingival dimension of the archwire slot remains constant for all brackets. Accordingly, in one embodiment, the occlusal-gingival dimension of the archwire slot as a percentage of the occlusal-gingival dimension of the archwire may range from 102% to 110%.

Table 2 below provides example of dimension ranges for the archwire slots of the brackets using a square archwire that measures 0.020"×0.020". In such embodiments, the occlusal-gingival dimension of the archwire slots in the brackets of a system using a final archwire that is 0.020"×0.020" square is 0.021" in such an embodiment, with a range of 0.0204" to 0.022".

TABLE 2

LABIAL-LINGUAL DIMENSION OF SLOT USING SQUARE ARCHWIRE OF .020" × .020."

| Tooth Position | Example Embodiment (inches) | Range Minimum (inches) | Range Maximum (inches) |
|---|---|---|---|
| Central | 0.021 | 0.0204 | 0.022 |
| Lateral | 0.021 | 0.0204 | 0.022 |
| Cuspid | 0.021 | 0.0204 | 0.022 |
| 1$^{st}$ Bicuspid | 0.023 | 0.022 | 0.025 |
| 2$^{nd}$ Bicuspid | 0.023 | 0.022 | 0.025 |
| 1$^{st}$ Molar | 0.026 | 0.024 | 0.028 |
| 2$^{nd}$ Molar | 0.026 | 0.024 | 0.028 |

While Table 2 illustrates example dimensional ranges for a square archwire measuring 0.020"×0.020", in other embodiments, the labial-lingual and occlusal-gingival dimensions of the final archwire can range from 0.017"× 0.017" square to 0.021"×0.021" square. In still other embodiments, the dimensions of the archwire may be larger or smaller than the ranges provided.

In the embodiment described above, the bracket sizes are essentially grouped based on the specific teeth to which they are attached. For example, all the anterior teeth 120 have respective brackets with the same dimensions for the archwire slot, and all the posterior teeth 150 have respective brackets with the same dimensions for the archwire slot. It should be understood that in other embodiments, the bracket sizes and dimensions may be grouped differently, or the labial-lingual dimension of the slot may simply become progressively deeper for each successive bracket beginning from the central tooth and ending with the second (or third) molar. Preferably, however, the brackets are arranged in groups to ensure that the various groups of teeth are controlled as needed (i.e., the anterior teeth are more finely controlled) to reduce treatment time while also providing a positive outcome for the patient. FIGS. 4A and 4B below illustrate an example embodiment of the improved orthodontic treatment method and system, illustrating how the archwire sits within the respective archwire slots of the anterior brackets 100 and the posterior brackets 102 during an example stage of treatment.

FIG. 4A illustrates the improved dental bracket 100 attached to one of the anterior teeth 120. The bracket 100 includes a square archwire slot 105 with a depth measured from the top surface in a labial-lingual direction to the first floor substantially equal to its width extending across in an occlusal-gingival direction such that the archwire 110 closely fits within the archwire slot 105 during a final stage of treatment. The square archwire slot 105 in these anterior brackets 100 has a minimum depth as compared to the brackets on the posterior teeth, such that the fit of the archwire 110 within the slot 105 provides for the most accuracy in positioning the anterior teeth 120, as is further described in detail below with reference to FIGS. 5A-7C. As noted previously, the brackets used on the central, lateral, and cuspid teeth in both the mandibular and maxillary dental arch have an archwire slot identical to the square archwire slot 105 of FIG. 4A.

FIG. 4B illustrates the improved dental bracket 102 attached to one of the posterior teeth 150. With reference to FIG. 4B, the dental bracket 102 has an archwire slot 115 that extends to a depth that is greater than the corresponding depth of the archwire slot 105. In some embodiments, the archwire slot 115 may have a generally rectangular shape, as compared to the generally square shape of the bracket 100 on the anterior teeth 120. Accordingly, the archwire 110 fits relatively loosely within the archwire slot 115 and provides more freedom of movement to the posterior teeth 150 as compared to the anterior teeth 120. While the posterior teeth 150 have more freedom to move, the relatively loose fit of the archwire 110 in the archwire slot 115 also results in a smaller degree of fine control of the tooth movement for the posterior teeth 150 as compared to the anterior teeth 120. However, the orthodontic treatment is designed such that all teeth in the dental arch as a whole have sufficient freedom of movement and the archwire and brackets provide sufficient control to move the teeth into a desired alignment.

It should be understood that FIGS. 4A and 4B are meant to illustrate an example configuration for a final stage of treatment. Those having skill in the art understand that initial and intermediate stages of treatment may use different sizes and shapes for the archwire as needed. For example, in some embodiments, the archwire cross section may progress from a round archwire at the start of treatment, then through various round and square cross sections over the course of treatment to a final archwire with a square cross section as shown in FIGS. 4A and 4B. The final square cross section archwire creates forces that are patient friendly and effective for tooth movement. In addition the square cross section of the final archwire provides excellent control of the tooth position.

Those of ordinary skill in the art will also appreciate that other embodiments of the disclosed systems and methods may use other cross sectional shapes than those just described. For example, in some embodiments the dental bracket 100 may have an archwire slot of a rectangular cross section, but smaller than that of the dental bracket 102. Similarly, in some embodiments the dental bracket 102 may have an archwire slot of a square cross section larger than that of the dental bracket 100.

The combination of archwire slot dimensions of the anterior and posterior brackets coupled with a square final archwire, according to the dimensions shown in Tables 1 and 2, provides an improved orthodontic treatment system and method that results in accurate positioning of the anterior and posterior teeth while maintaining efficient control of all teeth for reduced treatment time. With collective reference to FIGS. 5A-7C, the following paragraphs describe additional details relating to how the improved treatment method provides for more efficient control of tooth movement as compared to conventional treatment methods.

Figure 5A:
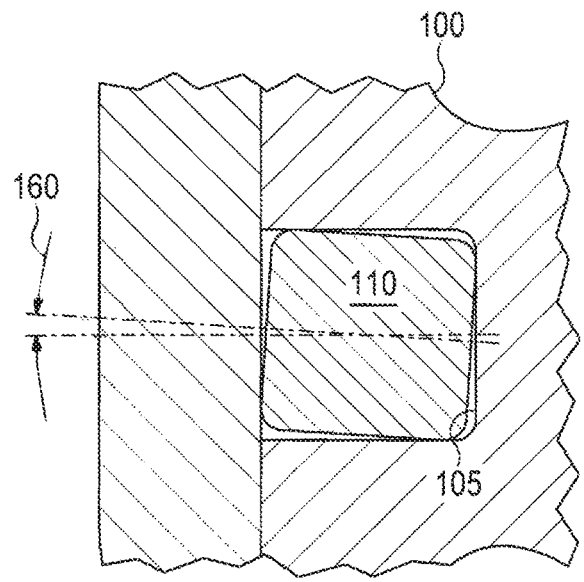
FIGS. 5A and 5B illustrate an example of improved torque control using the orthodontic system of FIGS. 4A and 4B.
Figure 5B:
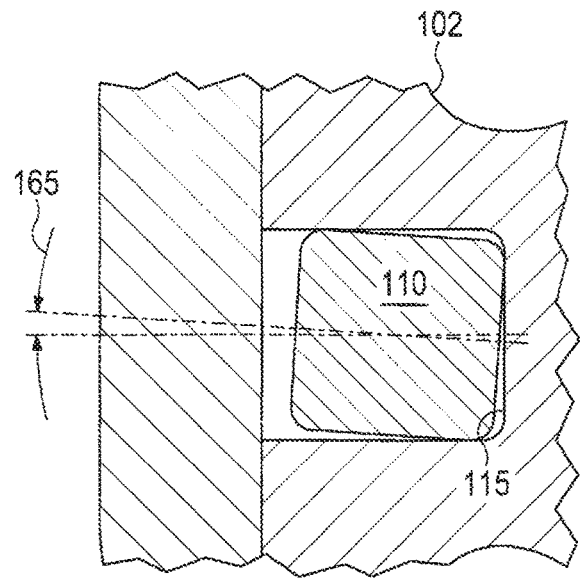
Figure 5C:
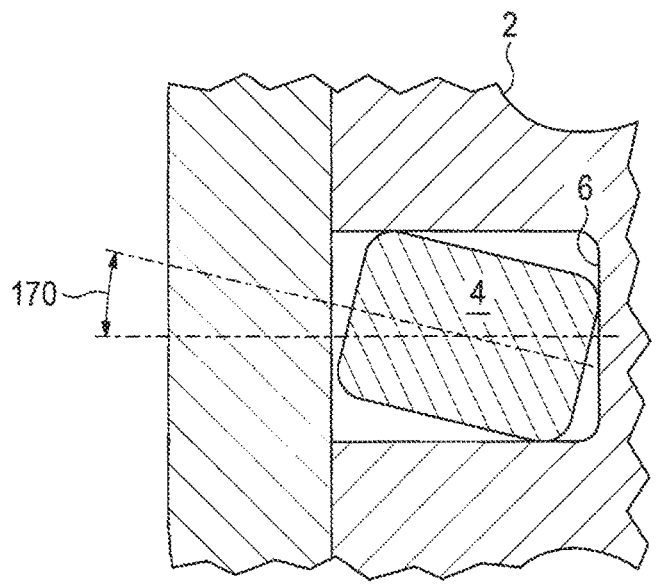
FIG. 5C illustrates typical torque control expected using the conventional orthodontic system of FIGS. 3A, 3B, and 3C.

With collective reference to FIGS. 5A, 5B, and 5C, the following illustrates how the varied dimensions of the archwire slots 105, 115 provide for much finer control of tooth positioning, earlier in treatment, than do existing systems. FIGS. 5A and 5B illustrate the control over torque (e.g., the angular rotation of a tooth during the course of treatment around a horizontal axis oriented in the mesial-distal direction) provided in the anterior teeth (FIG. 5A) and the posterior teeth (FIG. 5B) using the brackets as shown in FIGS. 4A and 4B during the finishing stages of treatment. As the archwire 110 connecting the brackets 100, 102 is twisted in the archwire slots 105, 115, respectively, the corners of the square archwire 110 the sides of the archwire slots at angles of rotation 160 (FIG. 5A) and 165 (FIG. 5B), thereby transmitting forces on the teeth to which the brackets are attached, and consequently inducing the teeth to rotate about an axis oriented in the mesial-distal direction.

As illustrated in FIG. 5A, a portion of the archwire 110 in the anterior bracket 100 is seated against and contacts the floor of the archwire slot 105, and another portion of the archwire 110 contacts the ligating structure extending over the archwire slot 105. As the archwire 110 is twisted in the archwire slot 105, the contact against the sidewalls and floor of the archwire slot 105, and against the ligating structure urge the tooth to rotate as desired. In FIG. 5B, the archwire 110 in the posterior bracket 102 similarly contacts the sidewalls and floor of the archwire slot 115, but the archwire 110 is spaced apart from the ligating structure because of the greater depth of the archwire slot 115 as compared to the archwire slot 105. In other embodiments (not shown), the archwire 110 may instead contact the ligating structure and be spaced apart from the floor of the archwire slot.

In FIG. 5A, because the archwire slot 105 is only slightly larger in overall dimension than the archwire 110, the angle of rotation 160 is relatively small. In FIG. 5B, the archwire slot 115 has a larger, rectangular shape as compared to the archwire slot 105, but because the occlusal-gingival dimension (i.e., width) is the same in both brackets, the angle of rotation 165 is also relatively small and may be equal (or substantially equal) to the angle of rotation 160. In some embodiments, the angles of rotation 160, 165 may range from 3° to 6° when using a square 0.020"×0.020" archwire, such as may be common during the final stages of treatment. When using a smaller square 0.018"×0.018" archwire, such as may be common during the initial stages of treatment, the angles of rotation 160, 165 may range from 13° to 16°.

FIG. 5C illustrates a conventional treatment method in accordance with one embodiment using a rectangular 0.018"×0.025" archwire 4 in conjunction with a bracket 2 having a rectangular archwire slot 6. In this configuration, it is readily apparent that the angle of rotation 170 is substantially larger than the respective angles of rotation 160, 165 of the improved system due to the looser fit of the archwire 4 in the archwire slot 2. In some embodiments, the angle of rotation 170 may range from 10° to 15° during the final stages of treatment. When using a smaller rectangular 0.014"×0.025" archwire that is more common during the initial stages of treatment, the angle of rotation 170 may range from 25° to 30°. Notably, the angles of rotation 160, 165 for both the initial and final stages of treatment are substantially smaller than the corresponding angles of rotation 170 in the conventional system, meaning that the system of FIGS. 5A and 5B offers more precise torque control than the conventional system of FIG. 5C.

Figure 6A:
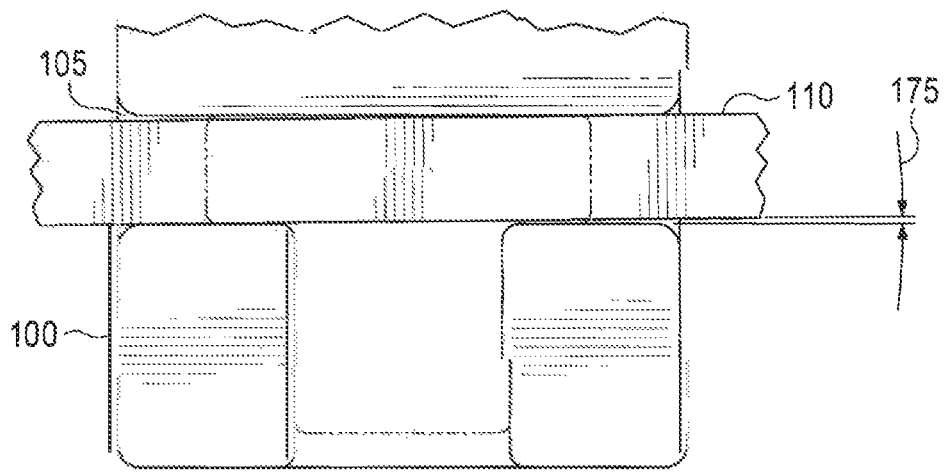
FIG. 6A illustrates an example of improved tip control using the orthodontic system of FIGS. 4A and 4B.
Figure 6B:
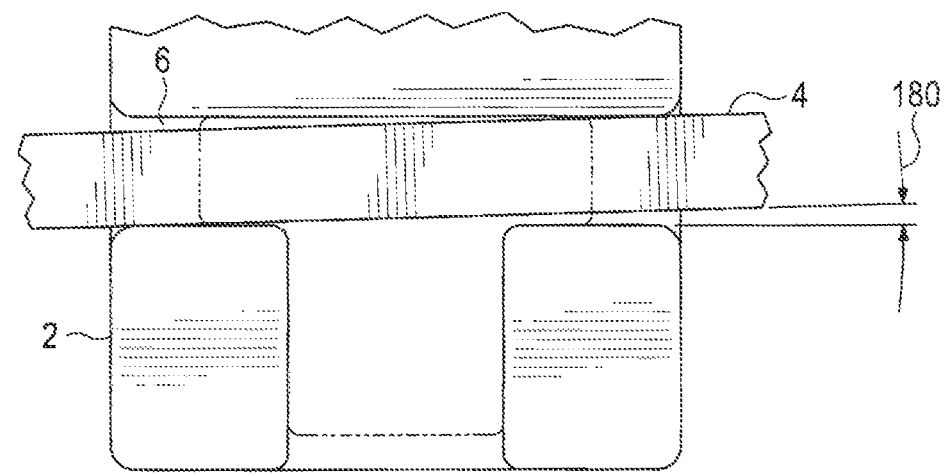
FIG. 6B illustrates typical tip control expected using the conventional orthodontic system of FIGS. 3A, 3B, and 3C.

With reference to FIGS. 6A and 6B, the following illustrates the same phenomenon with respect to tip control, which is the angular rotation of a tooth during the course of treatment around a horizontal axis oriented in the buccal-lingual direction. FIG. 6A illustrates the anterior bracket 100 with an archwire slot 105 through which an archwire 110 is used to position a tooth attached to the bracket. As illustrated in FIG. 6A, the relative fit of the archwire 110 within the archwire slot 105 provides a tighter control over the angle of rotation 175. When using a square 0.020"×0.020" archwire, the angle of rotation 175 is less than 1°, and may range between 0.4° and 0.6°. Those of ordinary skill in the art will appreciate that the diagram of FIG. 6A also represents the tip control provided by the posterior bracket 105.

FIG. 6B illustrates a conventional bracket 2 with an archwire slot 6 through which an archwire 4 is used to position a tooth attached to the bracket 2. As illustrated in FIG. 6B, the relatively looseness of the archwire 4 within the slot 6 results in a large angle of rotation 180. In some embodiments, using a rectangular archwire 0.018"×0.025" archwire, the angle 180 may range from 1.5° to 2.0°. Again, the angle 175 is noticeably less than the angle 180 achieved by the prior art system of FIG. 6B, thereby illustrating that the improved treatment method and system provides for finer tip control.

Figure 7A:
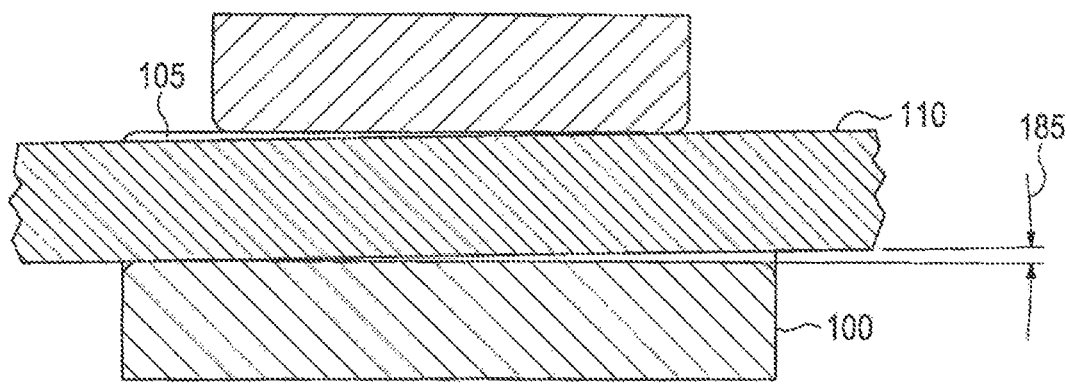
FIGS. 7A and 7B illustrate an example of improved rotation control using the orthodontic system of FIGS. 4A and 4B.
Figure 7B:
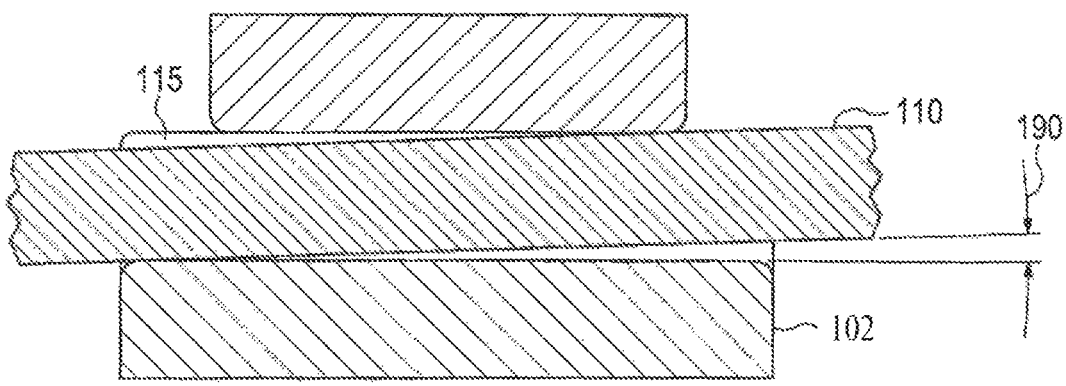
Figure 7C:
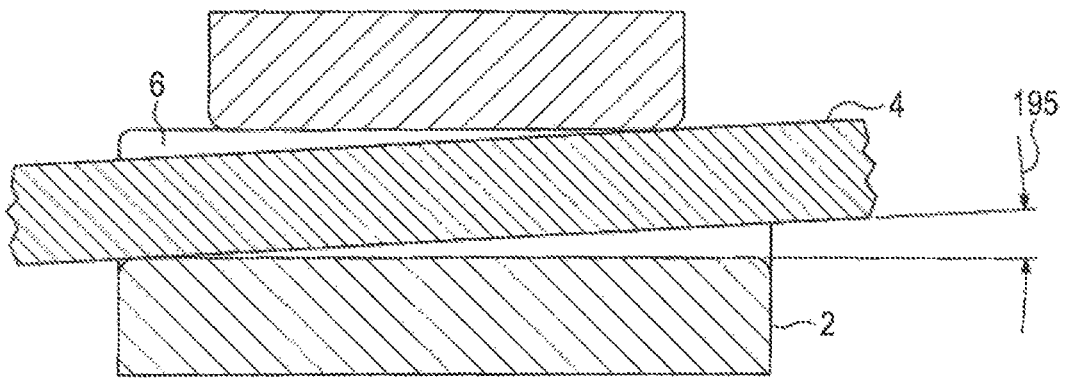
FIG. 7C illustrates typical rotation control expected using the conventional orthodontic system of FIGS. 3A, 3B, and 3C.

With reference to FIGS. 7A, 7B and 7C, the following illustrates the same phenomenon with respect to rotation control, which is the angular rotation of a tooth during the course of treatment around a vertical axis oriented in the incisal-gingival direction. FIG. 7A illustrates the anterior bracket 100 with an archwire slot 105 through which an archwire 110 is used to position a tooth attached to the bracket. As illustrated in FIG. 7A, the relative fit of the archwire 110 within the archwire slot 105 provides a tighter control over the angle of rotation 185 imparted by the bracket 100 on the anterior teeth 120. When using a square 0.020"×0.020" archwire, the angle of rotation 185 is less than 1°, and may range between 0.4° and 0.7°. When using a smaller square 0.018"×0.018" archwire, such as may be common during the initial stages of treatment, the angle of rotation 185 may range between 1.5° and 2.2°.

Similarly, FIG. 7B illustrates the posterior bracket 102 with an archwire slot 115 through which an archwire 110 is used to position a tooth attached to the bracket. When using a square 0.020"×0.020" archwire, the angle of rotation 190 may range between 1.7° and 2.2°. When using a smaller square 0.018"×0.018" archwire, such as may be common during the initial stages of treatment, the angle of rotation 190 may range between 3.0° and 3.3°.

FIG. 7C illustrates a conventional bracket 2 with an archwire slot 6 through which an archwire 4 is used to position a tooth attached to the bracket 2. As illustrated in FIG. 7C, the conventional system results in a rotational control angle 195 that may range between 1.5° and 2.0° using a rectangular archwire 0.018"×0.025" archwire. While the rotational control angle 195 may be similar to the angle of rotation 190, it is significantly larger than the angle of rotation 185. Accordingly, the improved treatment method and system provides for finer rotation control of the anterior teeth and slightly improved control for the posterior teeth as compared to the conventional treatment system.

While FIGS. 5A-7C focus primarily on the finishing stages of treatment to illustrate the improvement over torque, tip, and rotation over conventional treatment methods, the following tables and written description illustrate how the improved treatment system provides significant advantages during all stages of treatment. Using an initial phase of treatment as an illustrative example, where the improved system herein described uses an archwire of 0.014 diameter in an archwire slot having measurements shown in Table 2, the following Tables 3 and 4 together delineate the improvement in control over torque, tip, and rotation over conventional systems.

In an initial stage of treatment, a round archwire is preferably used, which provides no torque control since the round archwire has no edges to catch on the archwire slot when twisted, but achieves 4.46 degrees of rotation control and 3.83 degrees of tip control. The prior art system in the initial treatment phase, however, though similarly providing no control over torque, can only provide 8.47 degrees of rotation control and 4.29 degrees of tip control. As with control over torque, Table 3 shows that the disclosed system provides greater control over tooth movement at every stage of treatment.

TABLE 3

Improved Orthodontic System

|  |  | Phase | Initial | Working |  | Finishing & Detailing |
|---|---|---|---|---|---|---|
| Control |  | X-Section | .014 Rd. | .018 × .018 | .020 × .020 | .020 × .020 |
|  |  | Material | NiTI | NiTi | NiTi | TMA or SS |
|  |  | Torque Lock-up | None | 14.20 deg. | 4.18 deg. | 4.18 deg. |
|  |  | Rotation Lock-up | 4.46 deg. | 1.92 deg. | 0.64 deg. | 0.64 deg. |
|  |  | Tip Lock-up | 3.83 deg. | 1.92 deg. | 0.55 deg. | 0.55 deg. |

TABLE 4

Conventional Orthodontic System

|  |  | Phase | | | | |
|---|---|---|---|---|---|---|
|  |  | Initial | | Working | | Finishing & Detailing |
|  |  | X-Section | | | | |
|  |  | .014 Rd. | .018 Rd | .014 × .025 | .018 × .025 | .019 × .025 |
| Control | Material | NiTI | NiTi | NiTi | NiTi | SS |
|  | Torque Lock-up | None | None | 28.77 deg. | 13.78 deg. | 10.88 deg. |
|  | Rotation Lock-up | 8.47 deg. | 6.09 deg. | 1.85 deg. | 1.85 deg. | 1.85 deg. |
|  | Tip Lock-up | 4.29 deg. | 2.15 deg. | 4.29 deg. | 2.15 deg. | 1.62 deg. |

It should be understood that while the figures and associated written description illustrate example embodiments of brackets with specified dimensions, other configurations may be possible without departing from the principles of the disclosed subject matter. In addition, although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. It will be obvious to those having skill in the art that many changes may be made to the details of the above-described embodiments without departing from the underlying principles of the invention.

The invention claimed is:

1. An orthodontic treatment method, comprising:

affixing a first dental bracket to a first anterior tooth on a first dental arch, the first dental bracket having a first archwire slot extending downwardly from a top surface of the first dental bracket to a first floor, the first archwire slot having a first depth measured from the top surface in a labial-lingual direction to the first floor, the first dental bracket further including a first ligating member, the first ligating member being slidable between an open position and a dosed position, the first ligating member extending over the first archwire slot when in the dosed position;

affixing a second dental bracket to a second anterior tooth adjacent the first anterior tooth on the first dental arch, the second dental bracket having a second archwire slot extending downwardly from a top surface of the second dental bracket to a second floor, the second archwire slot having a second depth measured from the top surface in a labial-lingual direction to the second floor, the second depth being substantially equal to the first depth of the first archwire slot, the second dental bracket further including a second ligating member, the second ligating member being slidable between an open position and a dosed position, the second ligating member extending over the second archwire slot when in the dosed position;

affixing a third dental bracket to a third anterior tooth adjacent the second anterior tooth on the first dental arch, the third dental bracket having a third archwire slot extending downwardly from a top surface of the third dental bracket to a third floor, the third archwire slot having a third depth measured from the top surface in a labial-lingual direction to the third floor, wherein the third depth of the third archwire slot is substantially equal to the first and second depths of the first and second archwire slots, respectively, the third dental bracket further including a third ligating member, the third ligating member being slidable between an open position and a dosed position, the third ligating member extending over the third archwire slot when in the dosed position;

affixing a fourth dental bracket to a fourth tooth, that is a posterior tooth, adjacent the third anterior tooth on the first dental arch, the fourth dental bracket having a fourth archwire slot extending downwardly from a top surface of the fourth dental bracket to a fourth floor, the fourth archwire slot having a fourth depth measured from the top surface in a labial-lingual direction to the fourth floor, wherein the fourth depth of the fourth archwire slot is greater than the first, second, and third depths of the first, second, and third archwire slots, respectively, the fourth dental bracket further including a fourth ligating member, the fourth ligating member being slidable between an open position and a closed position, the fourth ligating member extending over the fourth archwire slot when in the closed position;

affixing a fifth dental bracket to a fifth tooth adjacent the fourth tooth on the first dental arch, the fifth dental bracket having a fifth archwire slot extending downwardly from a top surface of the fifth dental bracket to a fifth floor, the fifth archwire slot having a fifth depth measured from the top surface in a labial-lingual direction to the fifth floor, wherein the fifth depth of the fifth archwire slot is substantially equal to the fourth depth of the fourth archwire slot, the fifth dental bracket further including a fifth ligating member, the fifth ligating member being slidable between an open position and a closed position, the fifth ligating member extending over the fifth archwire slot when in the closed position;

and coupling the first, second, third, fourth, and fifth dental brackets using a first archwire extending through the first, second, third, fourth, and fifth archwire slots.

2. The orthodontic treatment method of claim 1, further comprising affixing a dental bracket to a sixth tooth adjacent the fifth tooth on the first dental arch, the sixth dental bracket having a sixth archwire slot extending downwardly from a top surface of the sixth dental bracket to a sixth floor, the sixth archwire slot having a sixth depth measured from the top surface in a labial-lingual direction to the sixth floor, wherein the sixth depth of the sixth archwire slot is greater than the fifth depth of the fifth archwire slot, the sixth dental bracket further including a sixth ligating member, the sixth ligating member being slidable between an open position and a closed position, the sixth ligating member extending over the sixth archwire slot when in the closed position.

3. The orthodontic treatment method of claim 2, further comprising affixing a seventh dental bracket to a seventh tooth adjacent the sixth tooth on the first dental arch, the seventh dental bracket having a seventh archwire slot extending downwardly from a top surface of the seventh dental bracket to a seventh floor, the seventh archwire slot having a seventh depth measured from the top surface in a labial-lingual direction to the seventh floor, wherein the sixth depth of the sixth archwire slot and the seventh depth of the seventh archwire slot are substantially equal, the seventh dental bracket further including a seventh ligating member, the seventh ligating member being slidable between an open position and a closed position, the seventh ligating member extending over the seventh archwire slot when in the closed position, and wherein the first archwire further extends through the sixth and seventh archwire slots to couple the sixth and seventh brackets with the first, second, third, fourth, and fifth brackets.

4. The orthodontic treatment method of claim 1, the method further comprising: decoupling the first archwire from the first, second, third, fourth, and fifth dental brackets; and coupling a finishing archwire to the first, second, third, fourth, and fifth dental brackets, the finishing archwire having a different labial-lingual dimension as compared to the first archwire, the finishing archwire extending through the first, second, third, fourth, and fifth archwire slots, wherein the first depth, second depth, and third depth in the labial-lingual direction of the first archwire slot, the second archwire slot, and the third archwire slot, respectively, ranges between 102% and 11.0% of the corresponding labial-lingual dimension of the finishing archwire, and wherein the fourth depth and fifth depth in the labial-lingual direction of the fourth archwire slot and the fifth archwire slot, respectively, ranges between 110% and 125% of the corresponding labial-lingual dimension of the finishing archwire.

5. The orthodontic treatment method of claim 1, the method further comprising:
   decoupling the first archwire from the first, second, third, fourth, and fifth brackets after a predetermined period of time; and
   coupling the first, second, third, and fourth, and fifth brackets using a second archwire having a different cross-section from the first archwire.

6. An orthodontic treatment method, comprising:
   affixing a first dental bracket to a first anterior tooth on a first dental arch, the first dental bracket having a first archwire slot extending downwardly from a top surface of the first dental bracket to a first floor, the first archwire slot having a first depth measured from the top surface in a labial-lingual direction to the first floor, the first dental bracket further including a first ligating member, the first ligating member being slidable between an open position and a closed position, the first ligating member extending over the first archwire slot when in the closed position;
   affixing a second dental bracket to a second anterior tooth adjacent the first anterior tooth on the first dental arch, the second dental bracket having a second archwire slot extending downwardly from a top surface of the second dental bracket to a second floor, the second archwire slot having a second depth measured from the top surface in a labial-lingual direction to the second floor, wherein the second depth of the second archwire slot is greater than the first depth of the first archwire slot, the second dental bracket further including a second ligating member, the second ligating member being slidable between an open position and a closed position, the send ligating member extending over the second archwire slot when in the closed position;
   affixing a third dental bracket to a first posterior tooth adjacent the second anterior tooth on the first dental arch, the third dental bracket having a third archwire slot extending downwardly from a top surface of the third dental bracket to a third floor, the third archwire slot having a third depth measured from the top surface in a labial-lingual direction to the third floor, wherein the third depth of the third archwire slat is greater than each of the first and second depths of the first and second archwire slots, respectively, the third dental bracket farther including a third ligating member, the third ligating member being slidable between an open position and a closed position, the third ligating member extending over the third archwire slot when in the closed position;
   affixing a fourth dental bracket to a second posterior tooth adjacent the first posterior tooth on the first dental arch, the fourth dental bracket having a fourth archwire slot extending downwardly from a top surface of the fourth dental bracket to a fourth floor, the fourth archwire slot having a fourth depth measured from the top surface in a labial-lingual direction to the fourth floor, wherein the fourth depth of the fourth archwire slot is greater than each of the first, second, and third depths of the first, second, and third archwire slots, respectively, the fourth dental bracket further including a fourth ligating member, the fourth ligating member being slidable between an open position and a closed position, the fourth ligating member extending over the fourth archwire slot when in the closed position; and
   coupling the first, second, third, and fourth brackets using a first archwire extending through the first, second, third, and fourth archwire slots;
   decoupling the first archwire from the first, second, third, and fourth brackets; and
   coupling a finishing archwire to the first, second, third, and fourth brackets, the finishing archwire having a different labial-lingual dimension as compared to the first archwire, the finishing archwire extending through the first second, third, and fourth archwire wherein the first depth and the second depth in the labial-lingual direction of the first archwire slot and the second archwire slot each ranges between 102% and 110% of the corresponding labial-lingual dimension of the finishing archwire, and wherein the third depth and the fourth depth in the labial-lingual direction of the third and fourth archwire slot ranges between 110% and 125% of the corresponding labial-lingual dimension of the finishing archwire.

7. An orthodontic treatment system, comprising:
   a first dental bracket affixable to a first tooth on a first dental arch, the first dental bracket having a first archwire slot extending downwardly from a top surface of the first dental bracket to a first floor, the first archwire slot having a first depth measured from the top surface in a labial-lingual direction to the first floor, the first dental bracket further including a first ligating member, the first ligating member being slidable between an open position and a closed position, the first ligating member extending over the first archwire slot when in the closed position;
   a second dental bracket affixable to a second tooth adjacent the first tooth on the first dental arch, the second dental bracket having a second archwire slot extending downwardly from a top surface of the second dental bracket to a second floor, the second archwire slot having a second depth measured from the top surface in a labial-lingual direction to the second floor, the second depth being substantially equal to the first depth of the first archwire slot, the second dental bracket further including a second ligating member, the second ligating member being slidable between an open position and a closed position, the second ligating member extending over the second archwire slot when in the closed position;
   a third dental bracket affixable to a third tooth adjacent the second tooth on the first dental arch, the third dental bracket having a third archwire slot extending downwardly from a top surface of the third dental bracket to a third floor, the third archwire slot having a third depth measured from the top surface in a labial-lingual direction to the third floor, wherein the third depth of the third archwire slot is substantially equal to the first and second depths of the first and second archwire slots, respectively, the third dental bracket further including a third ligating member, the third ligating member being slidable between an open position and a closed position, the third ligating member extending over the third archwire slot when in the closed position;
   a fourth dental bracket affixable to a fourth tooth adjacent the third tooth on the first dental arch, the fourth dental bracket having a fourth archwire slot extending downwardly from a top surface of the fourth dental bracket to a fourth floor, the fourth archwire slot having a fourth depth measured from the top surface in a labial-lingual direction to the fourth floor, wherein the fourth depth of the fourth archwire slot is greater than the first, second, and third depths of the first, second, and third archwire slots, respectively, the fourth dental bracket further including a fourth ligating member, the fourth ligating member being slidable between an open position and a closed position, the fourth ligating member extending over the fourth archwire slot when in the closed position;

a fifth dental bracket affixable to a fifth tooth adjacent the fourth tooth on the first dental arch, the fifth dental bracket having a fifth archwire slot extending downwardly from a top surface of the fifth dental bracket to a fifth floor, the fifth archwire slot having a fifth depth measured from the top surface in a labial-lingual direction to the fifth floor, wherein the fifth depth of the fifth archwire slot is substantially equal to the fourth depth of the fourth archwire slot, the fifth dental bracket further including a fifth ligating member, the fifth ligating member being slidable between an open position and a closed position, the fifth ligating member extending over the fifth archwire slot when in the closed position;

and an archwire, the first dental bracket coupled to the archwire at a position corresponding to a first anterior tooth on the first dental arch, the second dental bracket coupled to the archwire at a position corresponding to a second anterior tooth adjacent the first anterior tooth on the first dental arch, the third dental bracket coupled to the archwire at a position corresponding to a third anterior tooth adjacent the second anterior tooth on the first dental arch, the fourth dental bracket coupled to the archwire at a position corresponding to a first posterior tooth adjacent the third anterior tooth on the first dental arch, and the fifth dental bracket coupled to the archwire at a position corresponding to a second posterior tooth adjacent the first posterior tooth on the first dental arch, the archwire extending through the first, second, third, fourth, and fifth archwire slots.

8. The orthodontic treatment system of claim 7, further comprising a sixth dental bracket affixable to a sixth tooth adjacent the fifth tooth on the first dental arch, the sixth dental bracket having a sixth archwire slot extending downwardly from a top surface of the sixth dental bracket to a sixth floor, the sixth archwire slot having a sixth depth measured from the top surface in a labial-lingual direction to the sixth tooth, wherein the sixth depth of the sixth archwire slot is greater than the fifth depth of the fifth archwire slot, the sixth dental bracket further including a sixth ligating member, the sixth ligating member being, slidable between an open position and a closed position, the sixth ligating member extending over the sixth archwire slot when in the closed position.

9. The orthodontic treatment system of claim 8, further comprising a seventh dental bracket affixable to a seventh tooth adjacent the sixth tooth on the first dental arch, the seventh dental bracket having a seventh archwire slot extending downwardly from a top surface of the seventh dental bracket to a seventh floor, the seventh archwire slot having a seventh depth measured from the top surface in a labial-lingual direction to the seventh floor, wherein the sixth depth of the sixth archwire slot and the seventh depth of the seventh archwire slot are substantially equal, the seventh dental bracket further including a seventh ligating member, the seventh ligating member being slidable between an open position and a closed position, the seventh ligating member extending over the seventh archwire slot when in the closed position, and wherein the first archwire further extends through the sixth and seventh archwire slots to couple the sixth and seventh brackets with the first, second, third, fourth, and fifth brackets.

10. The orthodontic treatment system of claim 8, wherein the archwire is a finishing archwire, and wherein the first depth, the second depth, and the third depth in the labial-lingual direction of the first archwire slot, the second archwire slot, and the third archwire slot, respectively, ranges between 102% and 110% of the corresponding labial-lingual dimension of the finishing archwire, and wherein the fourth depth and fifth depth in the labial-lingual direction of the fourth archwire slot and the fifth archwire slot, respectively, ranges between 110% and 125% of the corresponding labial-lingual dimension of the finishing archwire, and wherein the sixth depth in the labial-lingual direction of the sixth archwire slot ranges between 120% and 140% of the corresponding labial-lingual dimension of the finishing archwire.

11. The orthodontic treatment method of claim 6, further comprising:

affixing a fifth dental bracket to a third posterior tooth adjacent the second posterior tooth on the first dental arch, the fifth dental bracket having a fifth archwire slot extending downwardly from a top surface of the fifth dental bracket to a fifth floor, the fifth archwire slot having a fifth depth measured from the top surface in a labial-lingual direction to the fifth floor, wherein the fifth depth of the fifth archwire slot is grater than each of the first, second, third, and fourth depths of the first, second, third, and fourth archwire slots, respectively, the fifth dental bracket further including a fifth ligating member, the fifth ligating member being slidable between an open position and a closed position, the fifth ligating member extending over the fifth archwire slot when in the closed position, wherein the fifth depth in the labial-lingual direction of the fifth archwire slot ranges between 120% and 140% of the corresponding labial-lingual dimension of the finishing archwire.

12. The orthodontic treatment method of claim 11, further comprising:

affixing a sixth dental bracket to a fourth posterior tooth adjacent the third posterior tooth on the first dental arch, the sixth dental bracket having a sixth archwire slot extending downwardly from a top surface of the sixth dental bracket to a sixth floor, the sixth archwire slot having a sixth depth measured from the top surface in a labial-lingual direction to the sixth floor, wherein the sixth depth of the sixth archwire slot is substantially equal to the fifth depth of the fifth archwire slot, the sixth dental bracket further including a sixth ligating member, the sixth ligating member being slidable between an open position and a closed position, the sixth ligating member extending over the sixth archwire slot when in the closed position, wherein the sixth depth in the labial-lingual direction of the sixth archwire slot ranges between 120% and 140% of the corresponding labial-lingual dimension of the finishing archwire.

13. The orthodontic treatment method of claim 3, the method further comprising:

decoupling the first archwire from the first, second, third, fourth, fifth, sixth, and seventh dental brackets; and coupling a finishing archwire to the first, second, third, fourth, fifth, sixth, and seventh dental brackets, the finishing archwire having a different labial-lingual dimension as compared to the first archwire, the finishing archwire extending through the first, second, third, fourth, fifth, sixth, and seventh archwire slots,
wherein the first depth, second depth, and third depth in the labial-lingual direction of the first archwire slot, the second archwire slot, and the third archwire slot, respectively, ranges between 102% and 110% of the corresponding labial-lingual dimension of the finishing archwire, and wherein the fourth depth and fifth depth in the labial-lingual direction of the fourth archwire slot and the fifth archwire slot, respectively, ranges between 110% and 125% of the corresponding labial-lingual dimension of the finishing archwire, and wherein the sixth depth and the seventh depth in the labial-lingual direction of the sixth archwire slot and the seventh archwire slot ranges between 120% and 140% of the corresponding labial-lingual dimension of the finishing archwire.

\* \* \* \* \*

UNITED STATES PATENT AND TRADEMARK OFFICE
CERTIFICATE OF CORRECTION

PATENT NO. : 11,160,638 B2
APPLICATION NO. : 15/958505
DATED : November 2, 2021
INVENTOR(S) : Thomas Pitts and Alberto Ruiz-Vela It is certified that error appears in the above-identified patent and that said Letters Patent is hereby corrected as shown below:

In the Claims

Column 13
Line 30, change "dosed portion" to --closed portion--.
Line 32, change "dosed portion" to --closed portion--.
Line 44, change "dosed portion" to --closed portion--.
Line 46, change "dosed portion" to --closed portion--.
Line 59, change "dosed portion" to --closed portion--.
Line 61, change "dosed portion" to --closed portion--.

Column 14
Line 28, change "affixing a dental bracket" to --affixing a sixth dental bracket--.

Column 15
Line 2, change "11.0%" to --110%--.
Line 14, before "fourth" delete "and".
Line 41, change "send ligating member" to --second ligating member--.
Line 50, change "third archwire slat" to --third archwire slot--.
Line 53, change "farther" to --further--.

Column 16
Line 5, after "position;" delete "and".
Line 15, change "the first second" to --the first, second--.
Line 15, after "fourth archwire" insert --slots,--.

Column 17
Line 50, change "the sixth tooth" to --the sixth floor--.
Line 53, change "ligating member being, slidable" to --ligating member being slidable--.

Signed and Sealed this
Eighth Day of November, 2022

*Katherine Kelly Vidal*
Katherine Kelly Vidal
*Director of the United States Patent and Trademark Office*

Column 18
Line 31, change "grater" to --greater--.